H. B. KEIPER.
BALL RETAINER.
APPLICATION FILED FEB. 3, 1913.

1,170,072.

Patented Feb. 1, 1916.

WITNESSES
Fenton S. Belt
W. W. Nairn Jr.

INVENTOR
Henry B. Keiper
By Julian C. Dowell
his Attorney

UNITED STATES PATENT OFFICE.

HENRY BRINSER KEIPER, OF LANCASTER, PENNSYLVANIA.

BALL-RETAINER.

1,170,072.  Specification of Letters Patent.  Patented Feb. 1, 1916.

Application filed February 3, 1913. Serial No. 745,988.

*To all whom it may concern:*

Be it known that I, HENRY BRINSER KEIPER, a citizen of the United States, residing at Lancaster, in the county of Lancaster and State of Pennsylvania, have invented certain new and useful Improvements in Ball-Retainers; and I do hereby declare the following to be a full, clear, and exact description of the invention, such as will enable others skilled in the art to which it appertains to make and use the same.

This invention relates to ball bearings, and more particularly to devices for caging balls and holding them in separated relation so as to keep the balls apart when in use in the bearings and prevent the balls from dropping out when the cage or retaining device is removed from the bearings.

The object of the invention is to provide a simple, inexpensive and durable device of the character referred to, which shall possess all of the advantages of prior retainers and separators of a similuar character and the added advantage of greater strength and efficiency and greater capacity to resist pressure tending to oust the ball from its seat in whatever direction the force may be exerted. A device of this same general character heretofore devised by me is shown in Patent No. 686,617, issued to me November 12, 1901, and my present invention is designed as an improvement upon the device shown in said patent.

The invention will first be hereinafter more particularly described, with reference to the accompanying drawings, which form a part of this specification, and then pointed out in the claims at the end of the description.

A preferred form of embodiment of my invention is illustrated in the accompanying drawings, in which—

Figure 1:
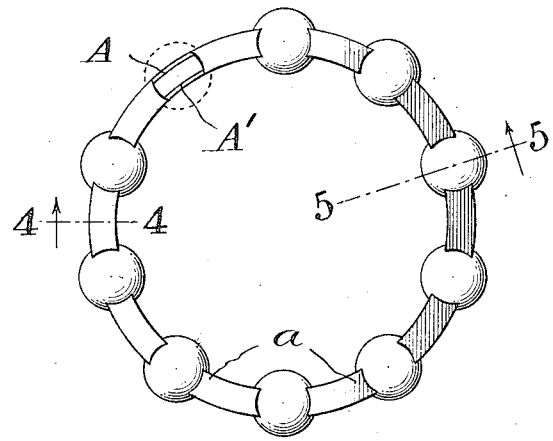
Figure 2:
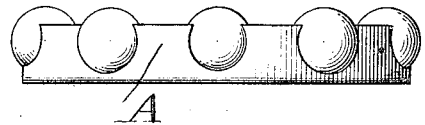
Figure 3:
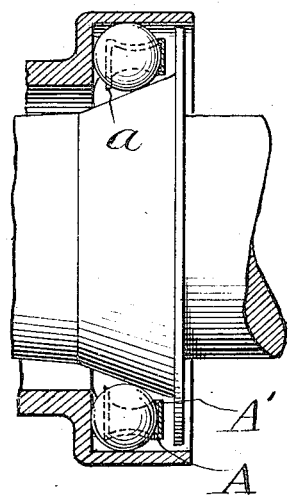
Figure 4:
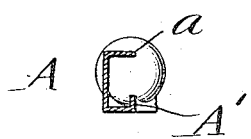
Figure 5:
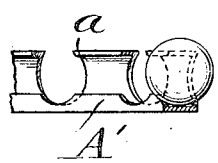

Figure 1 represents a plan view of my improved ball-retainer and seperator placed in a horizontal position; Fig. 2 is an edge view of the device positioned as shown in Fig. 1; Fig. 3 is a vertical sectional view showing a cup and cone bearing with the retainer in the position in which it is usually placed and the parts of which are indicated in proper relation to the ball retainer for use in connection therewith; Fig. 4 is a detail transverse section taken on the line 4—4 of Fig. 1; and Fig. 5 is a detail transverse section taken on the line 5—5 of Fig. 1, a ball being shown in side elevation and a standard on the far side of the ball being indicated in dotted lines.

As shown in said drawings, in which the same reference letters are used to denote corresponding parts in different views, the ball retaining and separating device consists of an annular or flat base-ring having marginal flanges A, A¹, extending substantially at right angles thereto and provided with scalloped edges forming alternating ridges or projections and concavities, the projections arranged along one edge of the ring being of such length and shape as to provide intermediate concavities which are substantially semi-circular in form, while the projections arranged along the other edge, preferably the outer edge, extend a greater distance than one-half the diameter of a ball, so as to provided an intervening space of circular form but less than a complete circle and the diameter of which is less than the diameter of a ball. The free ends or extensions *a* of the longer projections are bent or turned toward the opposite marginal flange so as to overlie the base-ring substantially parallel therewith, and their opposed margins or sides are curved to conform to the curvature of the ball, the space therebetween being less than the diameter of the ball, whereby a skeleton-like housing is provided for a series of balls each resting on a flat base between adjacent projections which present contact points that will prevent the ball from escaping in any direction, the ball being encompassed on all sides or practically entirely around its circumference, and sufficiently loosely confined to permit free rotation in all directions, while any pressure tending to force a ball from its seat will be resisted by contact of the ball with the retainer at two or more points on opposite sides of its center.

I thus provide a very strong, durable and efficient ball-retaining and separating device, which is not liable to permit a ball to escape when it is removed from the bearings, and in which the liability to escape when in use in the bearings is obviated or reduced to a minimum, and at the same time provision is made for free rotation of the balls when in use in the bearings, without producing undue friction by contact with extended bearing surfaces, and when desired the balls may be removed or inserted without mutilating or injuring the retainer, by pressure sufficient to slightly spring apart the free ends of adjacent projections between which the ball is confined and which are sufficiently resilient for this purpose.

The retainer may be made by stamping or otherwise forming the same out of a piece of flat steel, of suitable thickness, for instance, by placing the flat piece on a flat surface and first cutting out the metal so as to form the shorter projections and intermediate substantially semi-circular concavities along one margin and the longer projections with openings therebetween of circular form, but less than a complete circle, along the other margin, then turning up the marginal flanges with their projections, and finally bending over the free ends of the longer projections, thus making the retainer in three operations.

The advantages of my improved retainer are obvious. By the use of a single flat piece of steel I do away with all intricate machinery, and greatly simplify the process of manufacturing the retainer, reducing the cost and producing a very superior device which can be used with any bearing, and which will be comparatively stronger than any yet manufactured, and will obviate to a greater degree than has heretofore been possible, the danger of the balls crushing or breaking off parts of the retainer and the danger of the retainer being ground up when in use in the bearings. As stated, the device is preferably constructed integrally from a single piece of flat steel, cut or stamped and bent into the desired shape, but it may be cut or swaged from a solid block of metal or spun from a metal tube and may be made as heavy or as light as may be desired for the different uses to which a device of this character may be put, or according to the size of the balls it is desired to use.

It will be observed that when the retainer is placed in a cup and cone bearing, as shown in Fig. 3 of the drawings, the balls are positioned between the cup and cone members with the base-ring of the retainer at one side and the bearing surface of the cup directly opposite, and the retainer hugs the ball all the way around, keeping it in place and in proper alinement, so that all of the balls will run in the same track without liability of permitting any ball to escape, and without undue friction caused by contact with the retainer, and if a ball should break in half its parts will be kept together and carried around with the series without danger of being wedged in between other parts and breaking the bearing or grinding up the retainer.

It will be understood, of course, that the form of the retainer may be varied without departing from the spirit and scope of my invention; for instance, the marginal flanges need not necessarily extend at right angles to the base-ring, nor is it absolutely necessary that the free ends of the longer series of projections should extend at right angles from the major portions, and it may be desirable in some cases to form the longer projections on the inner instead of the outer margin of the base-ring; hence I do not desire to be limited to the specific form and arrangement shown and described.

Having thus described my invention, what I claim as new and desire to secure by Letters Patent of the United States is:

1. A ball retainer and separator comprising a substantially flat ring-shaped base having its marginal portions or edges upturned and formed with a series of opposed approximately semi-circular recesses to provide seats for a series of balls, the upturned portion of the outer margin being extended in the form of spaced projections enlarging toward their upper ends so as to provide openings therebetween which are circular in form but slightly less than a complete circle, said projections having their free ends turned inwardly over said flat base and said free ends of adjacent projections having their opposed sides curved to conform to the curvature of an interposed ball, the device being adapted to confine a series of balls between said base and upturned marginal portions and the free ends of said projections with the balls resting on the base and projecting therefrom in three directions.

2. A ball-retaining and separating device comprising an annular base portion having an upturned inner edge with a series of substantially semi-circular recesses therein of less height than the diameter of the ball to be retained and a circular series of projections extending from the outer edge thereof and separated by openings of circular form of less than a complete circle and of less width than the balls to be retained but adapted to embrace more than one-half the diameter of a ball, the free ends of said projections extending inwardly over the base-ring and having their opposed sides curved to conform to the curvature of the balls and overlapping the balls on both sides of a line extending through the center of the ball.

3. A ball-retaining and separating device comprising a flat annular base portion having an upturned inner edge extending substantially at right angles thereto with a series of substantially semi-circular recesses therein of less height than the diameter of the ball to be retained and a circular series of projections extending from the outer edge thereof and substantially at right angles thereto and separated by openings of circular form but less than a complete circle and of less width than the balls to be retained but adapted to embrace more than one-half the diameter of a ball, the free ends of said projections extending inwardly over the base-ring and having their opposed sides curved to conform to the curvature of the balls and overlapping the balls on both sides of a line extending through the center of the ball.

In testimony whereof I affix my signature in the presence of two witnesses.

HENRY BRINSER KEIPER.

Witnesses:
 CHAS. E. LONG,
 C. A. PROST.

Copies of this patent may be obtained for five cents each, by addressing the "Commissioner of Patents, Washington, D. C."